US010235437B2

(12) United States Patent
Diwan et al.

(10) Patent No.: US 10,235,437 B2
(45) Date of Patent: Mar. 19, 2019

(54) TABLE BASED DATA SET EXTRACTION FROM DATA CLUSTERS

(71) Applicant: Informatica LLC, Redwood City, CA (US)

(72) Inventors: Saurabh Diwan, Bangalore (IN); Shivananda P. J., Karnataka (IN)

(73) Assignee: Informatica LLC, Redwood City, CA (US)

( * ) Notice: Subject to any disclaimer, the term of this patent is extended or adjusted under 35 U.S.C. 154(b) by 570 days.

(21) Appl. No.: 14/656,557

(22) Filed: Mar. 31, 2015

(65) Prior Publication Data

US 2016/0292240 A1 Oct. 6, 2016

(51) Int. Cl.
*G06F 17/30* (2006.01)

(52) U.S. Cl.
CPC .............................. *G06F 17/30563* (2013.01)

(58) Field of Classification Search
CPC ............. G06F 17/246; G06F 17/30371; G06F 17/30873; G06F 17/30256; G06F 17/30654; G06F 17/30864; G06F 17/30011; G06F 17/30265; G06F 17/30563
USPC .......................................................... 707/602
See application file for complete search history.

(56) References Cited

U.S. PATENT DOCUMENTS 6,938,041 B1 * 8/2005 Brandow ............ G06F 17/3056
7,565,335 B2 * 7/2009 Tang ..................... G06N 7/005 706/20
9,146,945 B2 * 9/2015 Kumar .............. G06F 17/30569
2006/0047617 A1 * 3/2006 Bacioiu ................ G06K 9/6262 706/59
2006/0122870 A1 * 6/2006 Austin .................. G06F 19/322 705/3
2012/0303645 A1 * 11/2012 Kulkarni-Puranik ........................ G06F 17/2229 707/756
2013/0238644 A1 * 9/2013 Mohan .................. G06F 17/246 707/756
2014/0062897 A1 * 3/2014 Muller .................. G06F 17/246 345/173
2014/0351001 A1 * 11/2014 Agrawal ............ G06Q 30/0201 705/7.29
2015/0186806 A1 * 7/2015 Hiltz-Laforge ............................. G06F 17/30572 705/7.11
2015/0278213 A1 * 10/2015 Anand ................ G06F 17/3053 707/723

* cited by examiner

*Primary Examiner* — Evan Aspinwall
(74) *Attorney, Agent, or Firm* — Amardeep S. Grewal; Reed Smith LLP

(57) ABSTRACT

A computer system and computer implemented method for extracting data set from data clusters that comprises of rows and columns of heterogeneous data values. A plurality of random data groups comprising of at least one of a plurality of contiguous row or columns of data values are selected. Each data value has a data type. A table template type is identified based on detection of a pattern between the data cells of the contiguous rows or columns. A table template header is identified that comprises of a starting position, and ending position and a width. A reference row or reference column indicating a start of a table body is determined. The data cells of the subsequent rows or columns in the table body are compared to the data cells of the reference rows to identify noise rows or columns that are removed from the table body.

27 Claims, 4 Drawing Sheets

330 338 332

| Name | Gender | Telephon | Age | Salary |
|---|---|---|---|---|
| Adam | M | 86767 | 42 | 10000 |
| Julie | F | 78907 | 45 | 10500 |
| John | M | 67890 | 32 | 10100 |
| Tom | M | 52637 | 23 | 15000 |
| Rita | F | 45687 | 39 | 20000 |
| Jay | M | 12547 | 24 | 11000 |

335 342

TABLE I (vertical)

355 350

| Name | Adam | Julie | John | Tom | Rita | Jay | Leslie |
|---|---|---|---|---|---|---|---|
| Gender | M | F | M | M | F | M | F |
| Telephon | 86767 | 78907 | 67890 | 52637 | 45687 | 12547 | 98562 |
| Age | 42 | 45 | 32 | 23 | 39 | 24 | 40 |
| Salary | 10000 | 10500 | 10100 | 15000 | 20000 | 11000 | 19000 |

TABLE II (horizontal)

305 310 315

| | Earnings(i | Telephon | Age | Salary |
|---|---|---|---|---|
| Adam | 2.9 | 86767 | 42 | 10000 |
| Julie | 3 | 78907 | 45 | 10500 |
| John | 2.33 | 67890 | 32 | 10100 |
| Tom | 4 | 52637 | 23 | 15000 |
| Rita | 5 | 45687 | 39 | 20000 |
| Jay | 3.2 | 12547 | 24 | 11000 |
| Leslie | 4.88 | 98562 | 40 | 19000 |

320

TABLE III (cross)

| | Col C1 | Col C2 | Col C3 | Col C4 | Col C5 | Col C6 | Col C7 | Col C8 | Col C9 |
|---|---|---|---|---|---|---|---|---|---|
| Row R1 | | | | ***Energy Info*** | | | | | |
| Row R2 | | | | ***Table 2.1*** | | | | | |
| Row R3 | | | | ***Million Barrels/ Day*** | | | | | |
| Row R4 | | | | **2005** | | | **2009** | | |
| Row R5 | | | | **Annual** | **Quarter** | | | | |
| Row R6 | | | | **Average** | **First** | **Second** | **Third** | | |
| Row R7 | | **Supply** | US | 8.32 | 8.781 | 8.97 | 9.13 | | |
| Row R8 | | | Other OE( | 13.56 | 12.4 | **11.62** | 11.6 | | |
| Row R9 | <note> | | OPEC | 34.95 | | 33.59 | 34.26 | | |
| Row R10 | | | Total Wor | **84.55** | 83.45 | 83.44 | 84.41 | | |
| Row R11 | | **Demand** | US | 20.8 | 18.18 | | 18.62 | | |
| Row R12 | | | Other OE( | 29 | 27.53 | 25.9 | 26.64 | | |
| Row R13 | | | China | 6.7 | 7.62 | 8.44 | 8.33 | | |
| Row R14 | | | Former US | 4.16 | 4.09 | 4.19 | | | |
| Row R15 | | | Total Wor | **84.04** | 83.38 | 83.65 | 84.22 | *check if US Q3 skewe* | |
| Row R16 | | **Stock Dra** | US Cmme | -0.12 | -0.53 | -0.36 | -0.05 | | |
| Row R17 | | | *Total Oil Supply* | | *High* | | | | |
| Row R18 | | | *US State a* | *50 US States* | | | | | |
| Row R19 | | | *Revised data in bold* | | | | | | |
| Row R20 | | | *For definition* | | | | | | |
| Row R21 | | | *Stock additions are negative* | | | | | | |

425

410

Example Table 405

| | Col C2 | Col C3 | Col C4 | Col C5 | Col C6 | Col C7 |
|---|---|---|---|---|---|---|
| Row R4 | | | **2005** | | | **2009** |
| Row R5 | | | **Annual** | **Quarter** | | |
| Row R6 | | | **Average** | **First** | **Second** | **Third** |
| Row R7 | **Supply** | US | 8.32 | 8.781 | 8.97 | 9.13 |
| Row R8 | | Other OE( | 13.56 | 12.4 | **11.62** | 11.6 |
| Row R9 | | OPEC | 34.95 | | 33.59 | 34.26 |
| Row R10 | | Total Wor | **84.55** | 83.45 | 83.44 | 84.41 |
| Row R11 | **Demand** | US | 20.8 | 18.18 | | 18.62 |
| Row R12 | | Other OE( | 29 | 27.53 | 25.9 | 26.64 |
| Row R13 | | China | 6.7 | 7.62 | 8.44 | 8.33 |
| Row R14 | | Former US | 4.16 | 4.09 | 4.19 | |
| Row R15 | | Total Wor | **84.04** | 83.38 | 83.65 | 84.22 |
| Row R16 | **Stock Dra** | US Cmme | -0.12 | -0.53 | -0.36 | -0.05 |

Extracted Table 440

FIG. 4B

TABLE BASED DATA SET EXTRACTION FROM DATA CLUSTERS

BACKGROUND

Technical Field

The subject matter described herein relates generally to data extracting, and in particular, to extract relevant data sets from a data cluster using templates.

Background Information

Many computer applications use data stored in spreadsheets and other database files. The data values in the spreadsheets and database files may be organized in multiple ways. In many cases it is necessary to transfer data between different applications. Some of these data values in the rows and columns may be undesirable to transfer such as comments, summaries, titles or other such information. This is because most software is configured to import from only simple spreadsheets and database files, and the additional data may not import correctly. In most cases, the extracting of desired data from the spreadsheets and database files is a manual process that can be tedious and prone to errors.

SUMMARY

A computer implemented system is configured for data set extraction from a data cluster that uses table template types to detect a table structure in the data cluster. The table templates are preconfigured arrangements of headers, rows and columns that define the locations of desired data in the various types of tables. Templates include vertical table templates in which column headers are always present, horizontal table templates in which row headers are always present and crosstab table templates in which both row and column headers are always present. Each table template type has a table header that is defined by a start position, an ending position and a width. The table template types and the table header allow for identification of the table body that includes desired and undesired data. A reference row or column is determined in the table body, and based on the reference row or column the undesired data or noise from the table body is determined and removed. The remaining data is the desired data set, which is then extracted from the data cluster.

BRIEF DESCRIPTION OF THE DRAWINGS

FIG. 3 illustrates exemplary table template types, according to one embodiment.

FIG. 4A illustrates an exemplary data cluster for data set extraction according to an embodiment.

FIG. 4B illustrates an exemplary extracted data cluster according to an embodiment.

DETAILED DESCRIPTION

Figure 1:
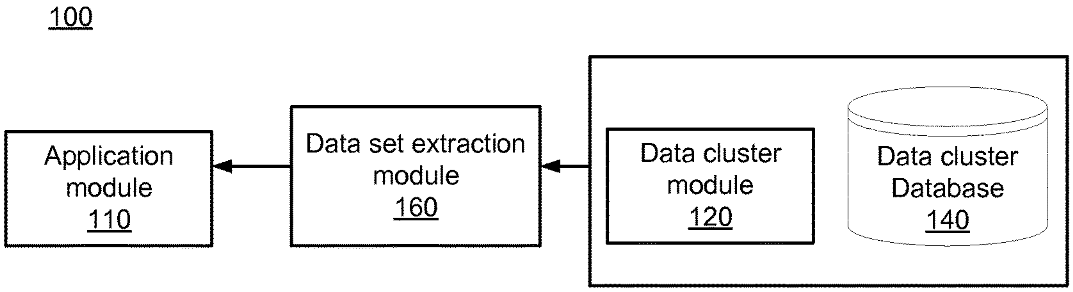
FIG. 1 is a high-level block diagram illustrating a computing environment for data set extraction from a data cluster, according to one embodiment.

FIG. 1 is a high-level block diagram illustrating a computing environment for data set extraction from a data cluster, according to one embodiment. The computing environment for data set extraction comprises of a data cluster module 120, a data cluster database 140, a data set extraction module 160 and an application module 110. The data cluster module 120 retrieves and stores a data cluster to and from the data cluster database 140. A data cluster comprises of rows and columns of heterogeneous data values in a data structure including one or more comments, titles, numeric data and string data.

The data cluster module 120 receives data clusters such as spreadsheets and other database files from an application and stores the data clusters in the data cluster database 140. These are data clusters that included desired and undesired data values. The data cluster is defined by a set of data structures as shown below:

Structure Cluster_UID={UID, Cluster_type, Cluster_ColHeader [ ], Cluster_MaxRight[y], Cluster_MaxLeft[y], Cluster_MaxUp[x], Cluster_MaxDown[x], Noise_Array[ ], Cluster_Sections[SectionName, DistanceY, relative_position], Cluster_Name}.

The UID is an identifier for a data cluster that differentiates it from other data clusters, for example, a numeric table id such as 0, 1, 2, etc. The cluster type indicates the table template type described in detail with respect to FIG. 2 below. The Cluster_ColHeader[ ] indicates a row number or a column number that provides header information in the data cluster. The Cluster_MaxRight[y], MaxLeft[y] specify the number of relevant farthest right column and the relevant farthest left column in the data cluster. The Cluster_MaxUp [x] and Cluster_MaxDown[x] specify the number of the relevant farthest top row and the relevant farthest down row in the data cluster. The Noise_Array[ ] includes a set of rows and/or column numbers that contain undesired data in the data cluster. The data cluster module 120 retrieves one or more data clusters from the data cluster database 140 and sends it to the data set extraction module 160 for extracting relevant rows and columns of data values by removing the noisy data value rows and columns The data set extraction module 160 is further described in detail with respect to FIG. 2 below. The extracted relevant data set is sent to the application module 110 for further processing by an application.

The application module 110 may be any application that uses spreadsheet or other database file data cluster to perform data analysis and obtain results.

System Configuration and Exemplary Method

Figure 2:
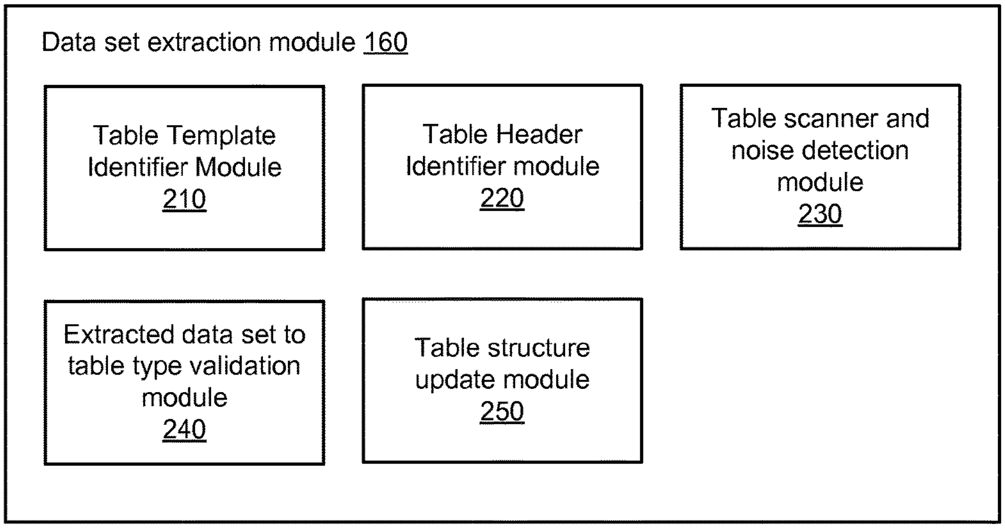
FIG. 2 is a high-level block diagram illustrating one embodiment of the data set extraction module.

FIG. 2 is a high-level block diagram illustrating one embodiment of the data set extraction module. The data set extraction module 160 receives a data cluster input such as a spreadsheet that contains rows and columns of data values in a table type data organization. Templates for the tables are predefined arrangements that describe the where various data types are located in a given type of table, such as location of the headers, titles and table body. There are three template types, as shown in the examples in FIG. 3. A vertical table template (Table I) defines a table in which data records 335 are arranged in rows, and column headers 330 are always present and represent the attributes or fields (for example Name, Gender, Telephone Number, Age, Salary in Table I) for each record. The data records 335 further comprise of a set of data cells 342, shown with a highlighted boundary, that contain a data value, each of the data value has a data type. A data value can be desired data, for example, name, gender or age of a person or undesired data, for example comments, titles or blank cells. A data type can be a string data 332, numeric data 338, date, time, etc. A horizontal table template (Table II) defines a table in which data records 355 are arranged in columns, and row headers 350 are always present and represent the attributes or fields (for example Name, Gender, Telephone Number, Age, Salary in Table III) of each record 355. A crosstab table template (Table III) defines a table in which data records 315 are present in an array in which both column 305 and row 310 headers are always present. Additionally, a crosstab table template includes a vertical table template and a horizontal table template. If the vertical table template data is extracted from the crosstab table template, the data points, arranged across multiple rows, must be of numeric data type. Similarly if the horizontal table template data is extracted from the crosstab table template, the data points, arranged across multiple columns must be of numeric data type. The data records for the horizontal template type are similar to the data records for a vertical type template.

The table template identifier module 210 receives the data cluster and identifies a table type for the data cluster with the use of a statistical algorithm such as a matched random sampling algorithm, that compares data values from the data cluster to each other, to identify a pattern of change in data types, and then matches that pattern to one or more of the templates, further described below. The template identifier module 210 is configured to identify a template type for a data cluster, and is one means for performing this function. The template identifier module 210 selects an arbitrary subset of data points D ($d_1 \ldots d_n$) from the data cluster comprising of m data points. Each data point represents a column of data in the data cluster. The number of columns selected is preferably greater than 50% of the total number of columns m in the data cluster. The data points D are selected randomly, i.e. each data point is chosen entirely by chance and is non-biased.

The selected random data points are analyzed to detect a pattern across each data cell of the columns that are included in the data points D. More specifically, for each selected data point (column) ($d_1 \ldots d_n$) the module traverses each cell in the column and compares the data type of the cell to the data type of the previous cell, to identify a change in the data type between data cells. A change in a data type includes a change such from a first data type (e.g., string, numeric, data, currency) to a second, different data type. For example, a change from a string data type in one cell to a numeric data type in the next cell, or from string to date, or any other combination of data types.

For each data point ($d_1 \ldots d_n$), two counters c1 and c2 are maintained to detect the pattern. The counter c1 counts the number of times a data type change occurs between data cells of a data point, that is the number of data type changes scanning down the cells of a column. The counter c2 counts the number of times a data type change does not occur when scanning down the data cells, i.e. the same data type repeats in a subsequent data cell. If c1, the number of data type changes, is less than or equal to c2, the number of same data types, then the resulting table template based on the data point is identified as the vertical table template. If c1 exceeds c2, then resulting table template based on the data point is identified as the horizontal table template.

The results R ($r_1 \ldots r_n$) of each data point ($d_1 \ldots d_n$) are sampled using a statistical method like a matched random sampling algorithm to determine the table template type. Each result ($r_1 \ldots r_n$) is matched with a second result ($r_1 \ldots r_n$) based on a characteristic (for example, a consecutive pattern for X % of results R ($r_1 \ldots r_n$), wherein the pattern is a same value of a second result as compared to the value of the first result) and then individually assigned to a group indicating the presence of a template type. The template type group that is assigned the maximum number of results ($r_1 \ldots r_n$) is the identified table template type. That is if more data points have c1<=c2, then the template type is a vertical table type; on the other hand if more data points have c1>c2, then the template type is a horizontal table type.

To understand the identification method, the following example is provided. FIG. 4A illustrates an example data cluster for data set extraction. The example table 405 has 9 columns {C1-C9} and 21 rows (R1-R21}. The example table includes undesired data like the comments 415 and blank cells 410 in rows R17-R21 and titles 420 in rows R1-R3. The data cells 425 between rows (R4,R16) and columns (C1,C7) contain desired data. The example data cluster can be defined as Structure Cluster 0={0, unknown, null, 9, 1, 1, 21, null, null, null} wherein 9 is the relevant farthest right column and 1 is the relevant farthest left column in the data cluster. Similarly 1 is the farthest top row and 21 is farthest bottom row. All other data structures have an initial null value or an unknown value.

To identify the table template type, the first step is to select random data points from columns 1 to 9. This is done using a random number generator. In this example, let the generated data points D ($d_1 \ldots d_n$) be columns (2,5,7). The columns 2, 5, and 7 are analyzed to detect a pattern across each data cell of the columns. For each column, two counters c1 and c2 are maintained. The counter c1 counts the number of times a data type change occurs between data cells down the column. The counter c2 counts the number of times a data type change does not occur between data cells of the column.

For Column 2 ($d_1$)–c1=0; c2=0; $r_1$=vertical table template

For Column 5 ($d_2$)–c1=2; c2=10; $r_2$=vertical table template

For Column 7 ($d_3$)–c1=2; c2=10; $r_3$=vertical table template

For all the data points D, c1 is less than c2 or c1 is equal to c2, resulting R{vertical table template, vertical table template, vertical table template} in identification of a vertical table template for the data points D.

For the result sampling, as shown above, the first result r1 is compared to the second result r2, both are at a same value, i.e. a vertical table template, thus determining a start of a consecutive pattern. The next result r3 also exhibits a same value as r1 and r2. If there were further results (e.g. r4 . . . r10) for a number of additional random data points (d4 . . . d10), these results would not be analyzed since a consecutive pattern has been detected from {r1, r2, r3} resulting in a determination that the identified table template is a vertical table template. In case the data point results indicate a pattern for both the horizontal table template and the vertical table template, either template can be selected and further computation is done based on the selected table template type.

The data cluster, along with the identified table template type is sent to the table header identifier module 220 that identifies a set of row numbers or column numbers that indicates a set of header rows or columns for the data cluster. Based on the table template type, the data cluster is vertically scanned or horizontally scanned to identify headers. If the table template type is a vertical table template, the data cluster is vertically scanned, i.e. row by row. A line segment $L_1$ is identified for a row $r_1$ that comprises of continuous data values in each data cell of the row. A line segment for a row is a data structure comprising of extreme left and right y co-ordinate information (e.g. column number) of the row, a rowIndex indicating the row number of the line segment and an array of datatypes that indicates data type of each data cell of the row.

$L_1$={maxleft, maxright, rowIndex, datatypes [ ]}

If the table template type is a horizontal table template, the data cluster is horizontally scanned, i.e. column by column. A line segment $L_1$ is identified for a column $c_1$ that comprises of continuous data values in each data cell of the column. A line segment for a column is a data structure comprising of extreme top and bottom x co-ordinate information (e.g. row number) of the column, a columnIndex indicating the column number of the line segment and an array of datatypes that indicates data type of each data cell of the column.

$L_1$={maxup, maxdown, colIndex, datatypes [ ]}

If a row or a column has multiple line segments, the line segment that has a maximum width is chosen. The width of a line segment for a row is defined by Lw=L(maxright−maxleft). The width of a line segment for a column is defined by Lw=L(maxdown−maxup).

A line segment $L_2$ and its width are determined for a subsequent row $r_2$ or column $c_2$. The line segment $L_2$ is compared with the previous line segment $L_1$ and in case of a datatype mismatch between the two line segments, the row scan or the column scan is stopped. The previous line segment $L_1$ is the identified header.

In case the data type between the two line segments matches, the width of $L_1$ is compared to the width of $L_2$ and the line segment with a greater width is detected as a header. The subsequent rows or columns are further scanned to identify more header rows or columns until a data type mismatch is detected between the line segments.

A header row or column data structure is defined as follows:

Hv={Header_Rows[ ], Header_StartPosition, Header_EndPosition} wherein Header_Rows[ ] comprises of x-coordinate information of the detected header row and the Header_StartPosition and the Header_EndPosition are y co-ordinates that indicate a header boundary.

Hc={Header_Columns[ ], Header_StartPosition, Header_EndPosition} wherein Header_Columns[ ] comprises of y-coordinate information of the detected header column and the Header_StartPosition and Header_EndPosition are x co-ordinates that indicate a header boundary.

Continuing the description with the example table of FIG. 4A, the table is identified as a vertical template type by the table template identified module 210. For a vertical table template, column headers are always present. The table template header identifier module 220 starts a vertical scan, i.e. row by row to identify a header row or a set of header rows.

Row $R_1$,$R_2$, $R_3$ scan—no continuous data values in the data cells; hence move to next row.

Row $R_4$ has a line segment starting at (4,4) co-ordinate position that extends up to (4,7).

The line segment for $R_4$ is identified as:

$L_4$={4, 7, 4, [S, S, S, S]}, $R_4$ is identified as a header row.

Row $R_5$ has a line segment identified as:

$L_5$={4, 7, 5, [S, S, S, S]}

The data types and width remain same in $L_4$ and $L_5$, hence we continue to scan row $R_6$.

$R_5$ is also identified as a header row.

Row $R_6$ has a line segment identified as:

$L_6$={4, 7, 6, [S, S, S, S]}

The data types and width remain same, hence we scan the next row scan i.e. $R_7$.

$R_6$ is also identified as a header row.

The line segment for $R_7$ is identified as:

$L_7$={2, 7, 7, [S, S, N, N, N, N]}

The data type changes in $L_7$ as compared to $L_6$, hence we stop the row scan.

The data types and width are same for $L_4$ to $L_6$, hence the rows are merged to create a set of identified headers defined as Hv={[4, 5, 6], 4, 7}.

The identified table template type by the table template identifier module 210 and the identified table header by the table header identifier module 220 are sent to a table scanner and noise detection module 230 that scans the data cluster to identify noise rows or columns and extracts a data set comprising of desired data.

If the identified table template type is a vertical table template, the rows are scanned to identify a relevant data set from the data cluster. The row subsequent to the Header_EndPosition of the Hv data structure is identified as a reference row $R_r$. The data types $dr_1 \ldots dr_n$ for each cell of the reference row are interpreted. Each subsequent row is scanned and the data types for every subsequent row from $R_{r+1}$ to $R_{Cluster\_MaxDown[x]}$ are determined. The data types of a subsequent row are compared to the data types of the reference row, e.g. the data types $d(r+_{1)1} \ldots d(r+1)_n$ of row $R_{r+1}$ are compared respectively to data types $dr_1 \ldots dr_n$ of row $R_r$. If there is a mismatch of data types in comparison with the data types of a reference row, the row is identified as a noise row. Additionally, rows comprising of only comments or blank cells are identified as noise rows.

The resulting vertical table data set data structure is defined as

Dv={Hv, DataTypes, Noisy_Rows, first_Row_Index, Last_Row_Index} wherein DataTypes indicate the data types of each data cell of the reference row and subsequent non-noisy rows, Noisy rows indicate the index of the identified noise rows, first_Row_Index indicates the index of a first desired data row and Last_Row_Index indicates the index of the extreme bottom desired data row.

If the identified table template type is a horizontal table template, the columns are scanned to identify a relevant data set from the data cluster. The column subsequent to the Header_EndPosition of the Hc data structure is identified as a reference column $R_c$. The data types $dc_1 \ldots dc_n$ for each cell of the reference column are interpreted. Each subsequent column is scanned and the data types for every subsequent column from $R_{c+1}$ to $R_{Cluster\_MaxRight[y]}$ are determined. The data types of a subsequent column are compared to the data types of the reference column, e.g. the data types $d(c+_{1)1} \ldots d(c+1)_n$ of column $R_{c+1}$ are compared respectively to data types $dc_1 \ldots dc_n$ of row $R_c$. If there is a mismatch of data types in comparison with the data types of a reference column, the column is identified as a noise column. Additionally, columns comprising of only comments or blank cells are identified as noise columns.

The resulting horizontal table data set data structure is defined as

Dh={Hc, DataTypes, Noisy_Columns, first_Col_Index, Last_Col_Index} wherein DataTypes indicate the data types of each data cell of the reference column and subsequent non-noisy columns, Noisy Columns indicate the index of the identified noise columns, first_Col_Index indicates the index of a first desired data column and Last_Col_Index indicates the index of the extreme right desired data column.

Continuing the description with the example table of FIG. 4A, the rest of the data cluster is scanned to detect noise rows and to extract a table body boundary that includes a desired and relevant data set.

From the previous step we have the header details as Hv={[4, 5, 6], 4, 7} and the Structure Cluster_0={0, unknown, null, 9, 1, 1, 21, null, null, null}. The table scanning and noise detection module 230 scans along row 7 to row 21, and column 4 to column 7 as indicated by the header details. The header start position and header end position for a vertical table template are indicated by a start column and an end column of the table. On scanning $R_7$ (Row 7) the data types of all the cells in that row are {N, N, N, N}. This is the reference row.

Continuing the scan of subsequent rows, $R_7$-$R_{16}$ match with the reference row data types and are identified as a part of the vertical table body, whereas $R_{17}$-$R_{21}$ data types do not match with the reference row data types, these rows are identified as noise rows.

The resulting vertical table data set data structure is defined as

Dv={Hv,[N,N,N,N],[17,18,19,20,21],7,16}.

The extracted data set validation module 240 analyzes the data types in the extracted data set to check for fact columns in case of an identified vertical table template. In a data warehousing concept, a fact column is a column in a fact table that comprises primarily of measurement data and is represented primarily by numeric data type. If a fact column is identified in a vertical table template type, the extracted data set validation module 240 performs further identification steps to search for a crosstab table template type.

The first step performed is to identify a data region boundary in the extracted data set. The data region boundary is defined by:

DataRegion_row=Header_Row+1 wherein (Header_Row=Header_Rows[Header_Rows_LastMember]); and DataRegion_Column=Header_StartPosition The Header_Row and Header_StartPosition are as defined and determined previously in the data structure Hv.

The second step performed is to identify a column hierarchy by scanning the row data cells starting from (DataRegion_row, DataRegion_Column) to ($R_1$, DataRegion_Column). For each of the data cell, if the data cell contains a data value, and the row containing that data cell has a line segment width greater than 1, add the row to the column hierarchy.

The third step performed is to identify a row hierarchy by scanning the column data cells starting from (DataRegion_row, DataRegion Column) to (DataRegion_row, $C_1$). For each of the data cell, if the data cell contains a data value, and the column containing that data cell has a line segment width greater than 1, add the column to the row hierarchy.

A crosstab header data structure is defined based on the column hierarchy and row hierarchy.

Hct={Header_Row,Header_Column,Header_RowHierarchyStartPosition,

Header_RowHierarchyEndPosition, Header_ColHierarchyStartPosition,

Header_ColHierarchyEndPosition, DataRegion_,DataRegion_Column,

Header_RowStartposition, Header_RowEndposition}

The crosstab table data structure is further defined as:

Dct=Hct, DataTypes, Noisy_Rows, first_Row_Index, Last_Row_Index}

Continuing the description with the example table of FIG. 4A, the data types of the vertical table dataset are analyzed, and fact columns are found, i.e. DataTypes=[N,N,N,N] represents 4 fact columns consisting of numeric data type. The extracted data set validation module 240 performs further identification steps to search for a crosstab table template type.

Identify data region boundaries:

DataRegion_row=7

DataRegion_Column=4

Identify column hierarchy: Scanning row cells from (7,4) to (1,4)

Add rows {4,5,6} to the column hierarchy.

Identify row hierarchy: Scanning column cells from (7,4) to (7,1)

Add columns {2,3} to the row hierarchy.

The crosstab table template data structure is defined as:

Dct={Hct,[N,N,N,N],[17,18,19,20,21],7,16} wherein Hct is the cross tab header defined as Hct={6,3,4,6,2,4,7,4,4,7}

The extracted data set that is validated by the extracted data set validation module 240 is sent to the table structure update module 250 that updates the structure cluster definitions for a cross tab table with the extracted data set. The extracted data set comprises of the relevant and desired data obtained by identification of the noise rows and removing them from the table structure by updating the table structure cluster. The table structure update module 250 updates the following data structures:

Cluster_Maxleft=Header_ColHierarchStartPosition

Cluster_Maxright=Header_RowEndposition

Cluster_=Header_RowHierarchyStartPosition

Cluster_Maxdown=Last_Row_Index

Continuing the description with the example table in FIG. 4A, the structure cluster is updated by the table structure update module 250 as follows:

Structure Cluster_0={0, unknown, null, 7, 2, 4, 16, null, null, null} wherein the extracted data set is between columns 2 to 7 and rows 4 to 16. The table 440 indicated by the updated structure cluster is illustrated in FIG. 4B that includes the extracted data set between columns C2 to C7 and rows R4 to R16, wherein columns C2, C3 and rows R4, R5 and R6 are header columns and rows.

Figure 5:
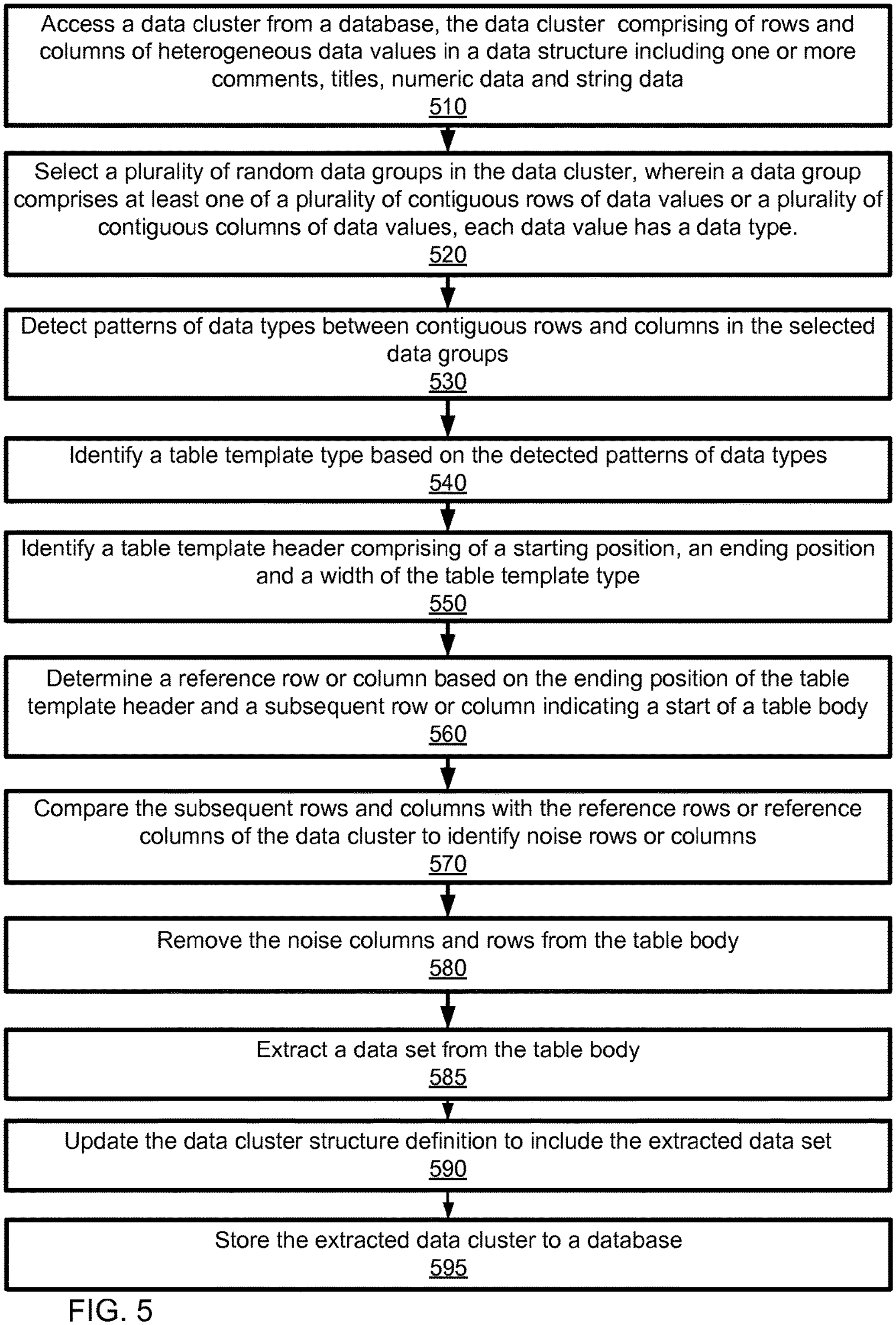
FIG. 5 is a flowchart illustrating a method of data set extraction from a data cluster, according to one embodiment.

FIG. 5 is a flowchart illustrating a method of data set extraction from a data cluster, according to one embodiment. A data cluster is accessed 510 by the data cluster module 120 from the data cluster database module 140. The data cluster comprises of rows and columns of heterogeneous data values in a data structure including one or more comments, titles, numeric data and string data. For example, a spreadsheet comprising of a table wherein the columns indicate name, age and gender of a set of school students, and each row indicates a data record comprising of a value for name, age and gender of a student.

The table type identification module 210 receives the data cluster and selects 520 a plurality of random data groups in the data cluster, wherein a data group comprises of at least one of a plurality of contiguous rows of data values or a plurality of contiguous columns of data values and each data value has a data type. The table type identification module 210 further detects 530 patterns of changes in data values between contiguous rows and columns in the selected data groups to identify 540 a table template type. A pattern change between data cells may be for example string data to numeric data, numeric data to date and other such changes.

The table type identification module 210 maintains two counters c1 and c2 for each row or column. The counter c1 counts the number of times a data type change occurs between data cells of a data point. The counter c2 counts the number of times a data type change does not occur between the data cells, i.e. the same data type repeats in a subsequent data cell. If more data points have $c1 \Leftarrow c2$, then the template type is a vertical table type; on the other hand if more data points have $c1 > c2$, then the template type is a horizontal table type.

The table header identifier module 220 identifies 550 a table template header comprising of a starting position, an ending position and a width of the table template type. Based on the table template type, the data cluster is vertically scanned or horizontally scanned to identify headers. A line segment is identified for a row or column that comprises of continuous data values in each data cell of the row or column. The data types of each data cell are identified in the line segment. The subsequent rows or columns are scanned to determine a line segment and compare it with the previous row or column line segment till a mismatch of data types is detected between the previous line segment and the current line segment. Once a mismatch is detected the previous row or column is identified as the table template header.

The table scanner and noise detection module 230 determines 560 a reference row or reference column based on the ending position of the table template header and a subsequent row or column indicating a start of a table body and compares 570 the subsequent rows and columns with the reference rows or reference columns of the data cluster to identify noise rows or columns. A reference row or column is the first row or column of the table body. The data type of each data cell of the reference row or column is scanned. The data type of respective cell of the subsequent rows or columns is compared to the data type of each cell of the reference row or column. If the data type does not match with the reference row or column, the subsequent row or column is identified as a noise row or column. The table scanner and noise detection module 230 further removes 580 the noise columns and rows from the table body, and then extracts 585 a relevant and desired data set from the table body. The table structure update module 250 updates 590 a data cluster structure definition to include the extracted data set by including the index of the rows and columns that represent the desired data portion of the table body and including the index of the rows and columns that are identified as noise rows or columns. The initial data cluster structure definition is retrieved from the database and is updated with the new table boundaries that describe the relevant table extracted from the original table. The data clusters that indicate the max left, max right, max up and max down cells that correspond to the four edge cells of the table, are updated, thus creating an updated table schema. For example, the four edge cells are [max_left col, max up row], [max_right col, max up row], [max_left col, max down row] and [max_right col, max down row]. The new table boundaries include the identified row and column headers that are a part of the relevant data set. The updated data cluster structure definition including the extracted data set is stored 595 in the data cluster database 140.

Additional Configuration Considerations

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method executed by one or more computing devices for extracting a data set from data clusters, the method comprising:

selecting, by at least one of the one or more computing devices, a data cluster from a data base, the data cluster comprising a plurality of rows and a plurality of columns of data values, wherein each data value has a data type;

selecting, by at least one of the one or more computing devices, a plurality of data groups in the data cluster, wherein each data group comprises a sequence of data values corresponding to a row in the plurality of rows or a column in the plurality of columns;

analyzing, by at least one of the one or more computing devices, for each data group in the plurality of data groups, the sequence of data values in that data group to determine a first quantity corresponding to changes in data types between contiguous data values in the sequence of data values and a second quantity corresponding to repeats of data types between contiguous data values in the sequence of data values;

identifying, by at least one of the one or more computing devices, a table template based at least in part on the first quantity and the second quantity for each data group in the plurality of data groups;

identifying, by at least one of the one or more computing devices, one or more header sequences in the data cluster by scanning one or more initial sequences of data values in the data cluster until an initial sequence of data values is detected having either a width or a data type that is inconsistent with a prior initial sequence of data values in the one or more initial sequences of data values, wherein each initial sequence of data values comprises two or more data values and wherein an orientation of the one or more initial sequences of data values is based at least in part on the identified table template;

designating, by at least one of the one or more computing devices, a sequence of data values after the one or more header sequences as a reference sequence of data values;

comparing, by at least one of the one or more computing devices, each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values;

extracting, by at least one of the one or more computing devices, the data set comprising the one or more header sequences, the reference sequence of data values, and the one or more table sequences from the data cluster; and transmitting, by at least one of the one or more computing devices, the extracted data set to one or more of: a data store or an application.

2. The method of claim 1, wherein the table template comprises one of a vertical table, a horizontal table, or a crosstab table.

3. The method of claim 1 wherein the one or more noise sequences comprise one or more subsequent sequences of data values having data types inconsistent with the reference sequence of data values.

4. The method of claim 1, wherein comparing each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values comprises, for each subsequent sequence of data values:

determining a sequence of data types corresponding to that subsequent sequence of data values;

determining whether the sequence of data types matches a reference sequence of data types corresponding to the reference sequence of data values by comparing the sequence of data types with the reference sequence of data types;

designating that subsequent sequence of data values as a noise sequence based at least in part on a determination that the sequence of data types does not match the reference sequence of data types; and designating that subsequent sequence of data values as a table sequence based at least in part on a determination that the sequence of data types matches the reference sequence of data types.

5. The method of claim 1, wherein selecting the plurality of data groups in the data cluster comprises selecting the plurality of data groups in the data cluster based at least in part on a random sampling algorithm.

6. The method of claim 1 wherein the plurality of data groups comprise a plurality of columns and wherein identifying a table template based at least in part on the first quantity and the second quantity for each data group in the plurality of data groups comprises:

assigning a vertical table template to every data group in the plurality of data groups having a first quantity less than or equal to the second quantity;

assigning a horizontal table template to every data group in the plurality of data groups having a first quantity greater than the second quantity;

identifying the vertical table template as the table template based at least in part on a determination that every data group in the plurality of data groups is assigned to the vertical table template; and identifying the horizontal table template as the table template based at least in part on a determination that every data group in the plurality of data groups is assigned to the horizontal table template.

7. The method of claim 1, wherein identifying one or more header sequences comprises:

identifying a first sequence of data types corresponding to a first sequence of data values in the one or more initial sequences of data values, the first sequence of data values comprising two or more data values;

identifying a second sequence of data types corresponding to a second sequence of data values in the one or more initial sequences of data values;

comparing the first sequence of data types to the second sequence of data types; and identifying the first sequence of data values as the header sequence when the second sequence of data types does not match the first sequence of data types or when the second sequence of data types has a width different than the first sequence of data types.

8. The method of claim 1, wherein the one or more initial sequences of data values are oriented as rows when the table template is identified as a vertical template type.

9. The method of claim 1, wherein the one or more initial sequences of data values are oriented as columns when the table template is identified as a horizontal template type.

10. At least one non-transitory computer-readable medium storing computer readable instructions that, when executed by one or more computing devices, cause at least one of the computing devices to:

select a data cluster from a data base, the data cluster comprising a plurality of rows and a plurality of columns of data values, wherein each data value has a data type;

select a plurality of data groups in the data cluster, wherein each data group comprises a sequence of data values corresponding to a row in the plurality of rows or a column in the plurality of columns;

analyze for each data group in the plurality of data groups, the sequence of data values in that data group to determine a first quantity corresponding to changes in data types between contiguous data values in the sequence of data values and a second quantity corresponding to repeats of data types between contiguous data values in the sequence of data values;

identify a table template based at least in part on the first quantity and the second quantity for each data group in the plurality of data groups;

identify one or more header sequences in the data cluster by scanning one or more initial sequences of data values in the data cluster until an initial sequence of data values is detected having either a width or a data type that is inconsistent with a prior initial sequence of data values in the one or more initial sequences of data values, wherein each initial sequence of data values comprises two or more data values and wherein an orientation of the one or more initial sequences of data values is based at least in part on the identified table template;

designate a sequence of data values after the one or more header sequences as a reference sequence of data values;

compare each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values;

extract a data set comprising the one or more header sequences, the reference sequence of data values, and the one or more table sequences from the data cluster; and transmit the extracted data set to one or more of: a data store or an application.

11. The at least one non-transitory computer-readable medium of claim 10, wherein the table template comprises one of a vertical table, a horizontal table, or a crosstab table.

12. The at least one non-transitory computer-readable medium of claim 10 wherein the one or more noise sequences comprise one or more subsequent sequences of data values having data types inconsistent with the reference sequence of data values.

13. The at least one non-transitory computer-readable medium of claim 10, wherein the instructions that, when executed by at least one of the one or more computing devices, cause at least one of the one or more computing devices to compare each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values further cause at least one of the one or more computing devices to, for each subsequent sequence of data values:

determine a sequence of data types corresponding to that subsequent sequence of data values;

determine whether the sequence of data types matches a reference sequence of data types corresponding to the reference sequence of data values by comparing the sequence of data types with the reference sequence of data types;

designate that subsequent sequence of data values as a noise sequence based at least in part on a determination that the sequence of data types does not match the reference sequence of data types; and designate that subsequent sequence of data values as a table sequence based at least in part on a determination that the sequence of data types matches the reference sequence of data types.

14. The at least one non-transitory computer-readable medium of claim 10, wherein the instructions that, when executed by at least one of the one or more computing devices, cause at least one of the one or more computing devices to select the plurality of data groups in the data cluster further cause at least one of the one or more computing devices to select the plurality of data groups in the data cluster based at least in part on a random sampling algorithm.

15. The at least one non-transitory computer-readable medium of claim 10, wherein the plurality of data groups comprise a plurality of columns and wherein the instructions that, when executed by at least one of the one or more computing devices, cause at least one of the one or more computing devices to identify a table template based at least in part on the first quantity and the second quantity for each data group in the plurality of data groups further cause at least one of the one or more computing devices to:

assign a vertical table template to every data group in the plurality of data groups having a first quantity less than or equal to the second quantity;

assign a horizontal table template to every data group in the plurality of data groups having a first quantity greater than the second quantity;

identify the vertical table template as the table template based at least in part on a determination that every data group in the plurality of data groups is assigned to the vertical table template; and identify the horizontal table template as the table template based at least in part on a determination that every data group in the plurality of data groups is assigned to the horizontal table template.

16. The at least one non-transitory computer-readable medium of claim 10, wherein the instructions that, when executed by at least one of the one or more computing devices, cause at least one of the one or more computing devices to identify one or more header sequences further cause at least one of the one or more computing devices to:

identify a first sequence of data types corresponding to a first sequence of data values in the one or more initial sequences of data values, the first sequence of data values comprising two or more data values;

identify a second sequence of data types corresponding to a second sequence of data values in the one or more initial sequences of data values;

compare the first sequence of data types to the second sequence of data types; and identify the first sequence of data values as the header sequence when the second sequence of data types does not match the first sequence of data types or when the second sequence of data types has a width different than the first sequence of data types.

17. The at least one non-transitory computer-readable medium of claim 10, wherein the one or more initial sequences of data values are oriented as rows when the table template is identified as a vertical template type.

18. The at least one non-transitory computer-readable medium of claim 10, wherein the one or more initial sequences of data values are oriented as columns when the table template is identified as a horizontal template type.

19. An apparatus for extracting data set from data clusters, the apparatus comprising:

one or more processors; and one or more memories operatively coupled to at least one of the one or more processors and having instructions stored thereon that, when executed by at least one of the one or more processors, cause at least one of the one or more processors to:

select a data cluster from a data base, the data cluster comprising a plurality of rows and a plurality of columns of data values, wherein each data value has a data type;

select a plurality of data groups in the data cluster, wherein each data group comprises a sequence of data values corresponding to a row in the plurality of rows or a column in the plurality of columns;

analyze for each data group in the plurality of data groups, the sequence of data values in that data group to determine a first quantity corresponding to changes in data types between contiguous data values in the sequence of data values and a second quantity corresponding to repeats of data types between contiguous data values in the sequence of data values;

identify a table template based at least in part on the first quantity and the second quantity for each data group in the plurality of data groups;

identify one or more header sequences in the data cluster by scanning one or more initial sequences of data values in the data cluster until an initial sequence of data values is detected having either a width or a data type that is inconsistent with a prior initial sequence of data values in the one or more initial sequences of data values, wherein each initial sequence of data values comprises two or more data values and wherein an orientation of the one or more initial sequences of data values is based at least in part on the identified table template;

designate a sequence of data values after the one or more header sequences as a reference sequence of data values;

compare each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values;

extract a data set comprising the one or more header sequences, the reference sequence of data values, and the one or more table sequences from the data cluster; and transmit the extracted data set to one or more of: a data store or an application.

20. The apparatus of claim 19, wherein the table template comprises one of a vertical table, a horizontal table, or a crosstab table.

21. The apparatus of claim 19, wherein the one or more noise sequences comprise one or more subsequent sequences of data values having data types inconsistent with the reference sequence of data values.

22. The apparatus of claim 19, wherein the instructions that, when executed by at least one of the one or more computing devices, cause at least one of the one or more computing devices to compare each of a plurality of subsequent sequences of data values after the reference sequence of data values with the reference sequence of data values to identify one or more noise sequences and one or more table sequences based at least in part on data types of the reference sequence of data values and of the plurality of subsequent sequences of data values further cause at least one of the one or more computing devices to, for each subsequent sequence of data values:

determine a sequence of data types corresponding to that subsequent sequence of data values;

determine whether the sequence of data types matches a reference sequence of data types corresponding to the reference sequence of data values by comparing the sequence of data types with the reference sequence of data types;

designate that subsequent sequence of data values as a noise sequence based at least in part on a determination that the sequence of data types does not match the reference sequence of data types; and designate that subsequent sequence of data values as a table sequence based at least in part on a determination that the sequence of data types matches the reference sequence of data types.

23. The apparatus of claim 19, wherein the instructions that, when executed by at least one of the one or more computing devices, cause at least one of the one or more computing devices to select the plurality of data groups in the data cluster further cause at least one of the one or more computing devices to select the plurality of data groups in the data cluster based at least in part on a random sampling algorithm.

24. The apparatus of claim 19, wherein the plurality of data groups comprise a plurality of columns and wherein the instructions that, when executed by at least one of the one or more computing devices, cause at least one of the one or more computing devices to identify a table template based at least in part on the first quantity and the second quantity for each data group in the plurality of data groups further cause at least one of the one or more computing devices to:

assign a vertical table template to every data group in the plurality of data groups having a first quantity less than or equal to the second quantity;

assign a horizontal table template to every data group in the plurality of data groups having a first quantity greater than the second quantity;

identify the vertical table template as the table template based at least in part on a determination that every data group in the plurality of data groups is assigned to the vertical table template; and identify the horizontal table template as the table template based at least in part on a determination that every data group in the plurality of data groups is assigned to the horizontal table template.

25. The apparatus of claim 19, wherein the instructions that, when executed by at least one of the one or more computing devices, cause at least one of the one or more computing devices to identify one or more header sequences further cause at least one of the one or more computing devices to:

identify a first sequence of data types corresponding to a first sequence of data values in the one or more initial sequences of data values, the first sequence of data values comprising two or more data values;

identify a second sequence of data types corresponding to a second sequence of data values in the one or more initial sequences of data values;

compare the first sequence of data types to the second sequence of data types; and identify the first sequence of data values as the header sequence when the second sequence of data types does not match the first sequence of data types or when the second sequence of data types has a width different than the first sequence of data types.

26. The apparatus of claim 19, wherein the one or more initial sequences of data values are oriented as rows when the table template is identified as a vertical template type.

27. The apparatus of claim 19, wherein the one or more initial sequences of data values are oriented as columns when the table template is identified as a horizontal template type.

* * * * *